United States Patent [19]

Brucker

[11] 4,358,413

[45] Nov. 9, 1982

[54] DEVICE FOR DISPERSING A LIQUID IN A GAS PHASE

[76] Inventor: Christian Brucker, 78490 Vicq, France

[21] Appl. No.: 227,652

[22] Filed: Jan. 23, 1981

[30] Foreign Application Priority Data

Feb. 1, 1980 [FR] France ................................ 80 02224

[51] Int. Cl.³ .............................................. B01F 3/04
[52] U.S. Cl. .................................. 261/36 R; 210/219; 210/242.2; 239/221; 239/456; 261/91; 261/120
[58] Field of Search ................ 261/36 R, 91, 120, 123, 261/DIG. 75, DIG. 79, 87, 93; 210/219, 220, 242.2; 239/221, 456; 209/169, 170

[56] References Cited

U.S. PATENT DOCUMENTS

| | | | |
|---|---|---|---|
| 3,497,185 | 2/1970 | Dively | 210/219 X |
| 3,722,679 | 3/1973 | Logue | 261/87 X |
| 3,745,387 | 7/1973 | Sydnor, Jr. et al. | 261/120 X |
| 3,797,809 | 3/1974 | Sydnor, Jr. | 261/120 X |
| 3,935,156 | 1/1976 | Richter | 261/DIG. 79 |
| 3,968,086 | 7/1976 | Romanowski | 261/123 X |
| 4,198,359 | 4/1980 | Todd | 210/220 X |

FOREIGN PATENT DOCUMENTS 2023739 11/1969 France .
2195476 3/1974 France .

*Primary Examiner*—Richard L. Chiesa
*Attorney, Agent, or Firm*—Spencer & Kaye

[57] ABSTRACT

The invention provides an aerator device for dispensing liquid in a gas phase by producing an upwardly-directed spray of the liquid from a tank. The device, which is intended to be submerged in a tank, comprises a motor-pump unit in the vicinity of the tank floor and a primary flared tube and a secondary flared tube coaxial therewith. The secondary flared tube is connected to a delivery nozzle by an intermediate duct, and the delivery nozzle is surmounted by an adjustable needle. The buoyancy of the whole assembly is ensured by a set of variably ballasted buoys which pivot at the end of support arms, and by an upper buoy concentric with the nozzle.

11 Claims, 4 Drawing Figures

DEVICE FOR DISPERSING A LIQUID IN A GAS PHASE

BACKGROUND OF THE INVENTION

The present invention relates to a device for dispersing a liquid in a gas phase, particularly by spraying the liquid, which is confined in a bed or tank, upwardly to disperse it in the gas phase.

A particularly important field in which devices of this kind are used is in the aerators of waste-water treatment installations, which utilise a biological reaction for purification of activated sludge.

In this technique of purifying waste-water, various types of aerating devices have successively been developed.

For example, overpressure systems are known, which are adapted to supply air to a pipe located near the floor level of the activating tank, this pipe being perforated or equipped with porous diffusers, in order to promote the formation of air bubbles which move upwards through the mass of fluid to be aerated.

Another technique uses horizontal rotary brushes, the axis of which are located above the water level, so that radial elements, either flexible in the form of bristles, or rigid in the form of blades, beat the water like paddle wheels.

Finally, surface turbines have been developed, which are provided with a vertical rotor equipped with a body submerged at water level, this body beating the air-water interface so as to project a water spray into the air.

The invention is developed from the state of the art represented by the third category of appliances, comprising a pump, which is at least partly submerged in the liquid between a flared suction tube and a delivery nozzle. Experience shows that in appliances of this kind, the screw constituting the active member of the pump has a relatively poor output, which is attributable to the necessarily limited height of the water spray, this height generally being distinctly less than, for example, one meter.

As is known, in order to ensure good aeration, it is sufficient to produce a spray which disperses the drops in a shower of very small height (less than one meter, as mentioned above); in fact, the liquid-air interface is saturated almost immediately.

Conversely, at total heads of water as low as this, the output of hydraulic pumps is very poor. Moreover, these surface aerators offer no possibility of a rational solution to the problem of mixing the lower layers of liquid (near to the floor of the tank) with the intermediate and surface layers; to obtain such a mixture, even imperfectly, it is necessary, with the devices known hitherto, to expend agitating power which is superfluous in relation to the oxygen requirement.

Specific prior art devices include the delivery nozzle described in French Pat. No. 2,195,476 (Harivel) which nozzle is located near the liquid-gas interface and which has an outer surface provided with a widened profile, and the disclosure of French Pat. No. 2,023,739 (Sydnor Hydro-Dynamics) which describes a driving motor arranged beneath the pump.

The object of the invention is to provide a device of the kind referred to which offers a considerably improved energy efficiency in comparison with known surface turbines.

Another object of the invention is to produce an aerator adapted to provide conditions which are particularly favourable to the effectiveness of biological processes for treating waste-water.

SUMMARY

A device according to the invention comprises a pump, which is intended to be at least partly submerged in the liquid between a flared suction tube and a delivery nozzle, in combination with a driving motor, and is substantially characterised in that a primary flared suction tube is located near the bottom of the tank containing the liquid, whilst the delivery nozzle is located near the liquid-gas interface, and a duct of a height adaptable to the depth of the liquid is provided between the two, the pump being submerged in the vicinity of the flared suction tube.

According to a preferred embodiment, a secondary flared tube is arranged externally and concentrically with said primary flared tube, the rising flow of liquid through the primary flared tube creating, by means of drag, a secondary rising flow which mingles with the primary flow downstream of the pump.

A device designed in this way enables the disadvantages described above to be overcome and offers a set of harmonious advantages, which are calculated to increase, to a surprising extent, the effectiveness of the biological purification processes which make use of the activated sludge.

In fact, because the liquid is drawn from the floor level of the tank; the aeration has an imperative and and greater effect on the sludge, which is driven along in the suction movement generated by the primary flux, enabling a direct action upon the micro-organisms carried by this sludge.

Experience shows that a result of pumping the sludge from the floor level is a more effective elimination of the chemical oxygen requirement. Moreover, the provision of a secondary flow means an increase in the delivery of the pump, for the same work, and hence an improvement in the energy efficiency.

Furthermore, the manufacturers of waste-water treatment installations have had, hitherto, to produce a tank in accordance with the characteristics of the aerator, and particularly the movements of the fluids, and bearing in mind the extraneous sedimentation. Henceforth, the manufacturer will be able to produce any desired tank design, since the invention offers the possibility of adapting the aerator to the particular features of the tank.

The operating conditions of a device according to the invention are practically independent of the movements, if any, of the water level, whereas these movements affect the operating conditions and, particularly, the energy efficiency of the "surface aerators" of the prior art.

According to another characteristic of the invention, the delivery nozzle possesses an external surface of revolution having a widened profile, and this nozzle can advantageously also be equipped with an inner needle-shaped confining surface, whose vertical position can be adjusted by any suitable means. Thus, the liquid spray can be modulated according to the construction; the spray angle can be determined by the selected shape of the delivery nozzle, whilst the spraying distance can, if required, be modulated in turn by the action of the needle on the outer confining surface.

DETAILED DESCRIPTION OF THE PREFERRED EMBODIMENTS

Figure 1:
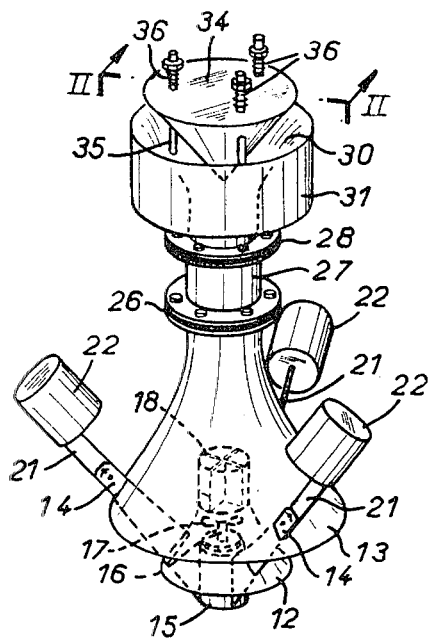
FIG. 1 is a perspective view of an embodiment of the device according to the invention.
Figure 2:
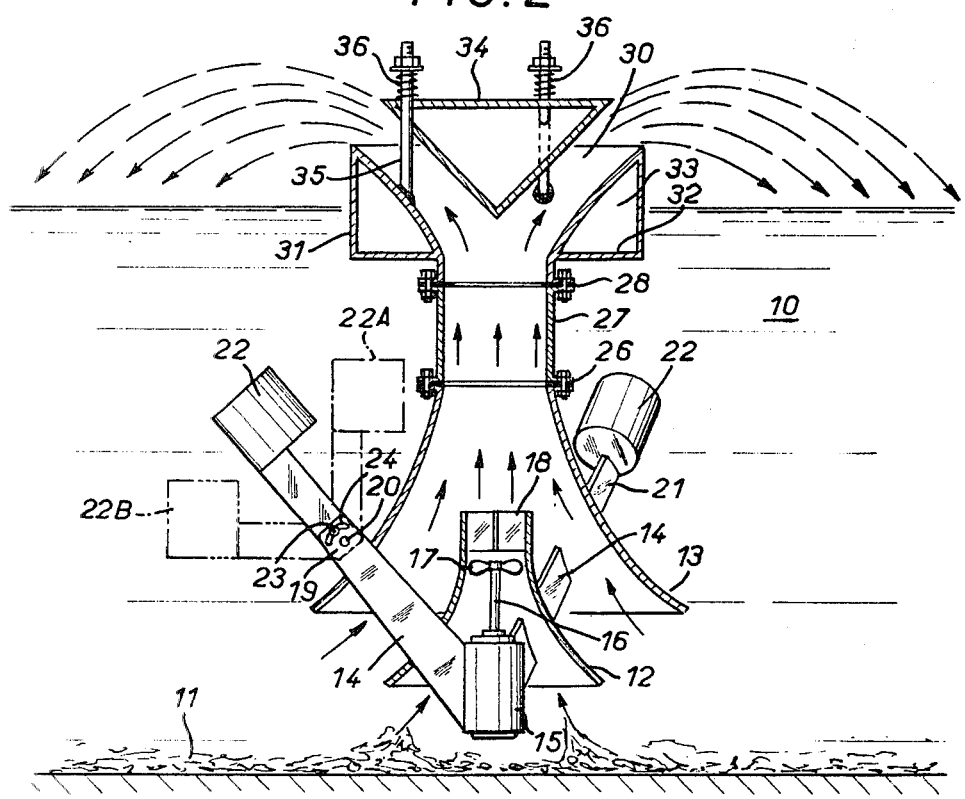
FIG. 2 is a corresponding elevation in axial section.

According to the embodiment illustrated in FIGS. 1 and 2, the device, which is submerged in a tank 10 having a floor 11, comprises a primary flared suction tube 12, which is arranged coaxially within a secondary flared tube 13 and which is held therein by a series of three radial arms 14. These arms are extended into the interior of the flared suction tube 12, in order to support in a position on the axis of the latter, an electric driving motor 15, whose shaft 16 carries a helical delivery wheel 17. Downstream of this wheel, the flared suction tube terminates in a length of duct 18, which is equipped, in known manner, with a series of flow-straightening vanes.

Each of the supporting arms 14 also possesses, externally of the secondary flared tube 13, an extension 19, at the end of which an arm or a directable arm element 21 is hinged on a pivot 20 and carries at its end a supporting buoy 22; the whole assembly constituted by this arm element 21 and buoy 22 can be fixed by means of a clamping bolt 23 and an arcuate slot 24, which is centered on the pivot 20 in a position adjustable between two extreme positions, as indicated at 22A and 22B respectively. The position indicated at 22A is a position of reduced bulk, particularly for transport, in which the buoyancy is ensured with a minimum torque. The other extreme position 22B corresponds to buoyancy with a maximum stabilising torque.

The secondary flared suction tube 13 terminates at a flange 26 connecting it to a duct element 27, at the other end of which is another flange 28, which enables a delivery nozzle 30 to be connected, this delivery nozzle presenting an outer surface confining the flow constituted by a surface of revolution having a widened profile. Furthermore, this nozzle surface confines, by interaction with an outer surface, for example a cylindrical surface 31 and a bottom 32, a volume of air 33, which constitutes a central supporting and stabilising buoy.

Finally, a conically shaped body 34, which is designed to slide on a series of guide rods 35 parallel to the axis of the device, constitutes a needle confining the flow on the inside, the vertical position of this needle being influenced, in the embodiment illustrated, by the compression springs 36 and the force exerted thereon.

A device constituted in this way is designed to float in the liquid mass, its supporting buoys 22 and 33 being designed so that the upper edge of the delivery nozzle 30 is positioned at a desired distance above the liquid level. While the supporting buoys 22 can be retracted for transport, thus reducing the bulk of the device, they ensure, in their extended position 22B, the stabilisation of the device within the liquid mass with a maximum torque. The duct element 27 is interchangeable, its axial dimension being selected so that the lower edge of the flared suction tube 12 is located at a small distance from the floor 11, bearing in mind the projection, if any, of the motor block 15. During operation, pumping is thus carried out with a head which corresponds to virtually the entire depth of the tank, and the sludge, which tends to become deposited on its floor, is necessarily entrained during operation. Added to the primary flow sucked into the flared tube 12 is an additional flow sucked into the secondary flared tube 13; this arrangement contributes to increasing the efficiency for a given head of water.

Figure 3:
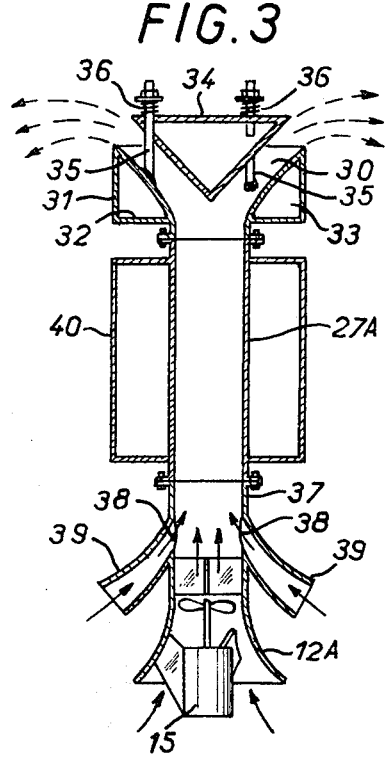
FIG. 3 is a view, similar to the preceding view, showing an alternative embodiment with a cylindrical buoy.

A similar result is obtained in the case of the alternative embodiment of FIG. 3, which does not carry a secondary flared tube, but in which, downstream of the primary flared tube 12A and upstream of the transition duct 27A, a length of duct 37 is provided, which has on its periphery a series of apertures 38, each of these apertures advantageously being associated, in this case, with a flow-guidance nozzle 39. The apertures fashioned in this way replace the secondary flared tube with a comparable effect of increasing the pumping rate.

In the embodiment of FIG. 3, a cylindrical supporting buoy 40 is arranged around the transition duct 27A and practically over the entire height thereof. In this embodiment, the stability of the device can be improved by arranging at the surface either a toroidal float or a series of floats located at the end of supporting arms of a suitable length to prevent any undesirable interference with the dispersion sheet.

Figure 4:
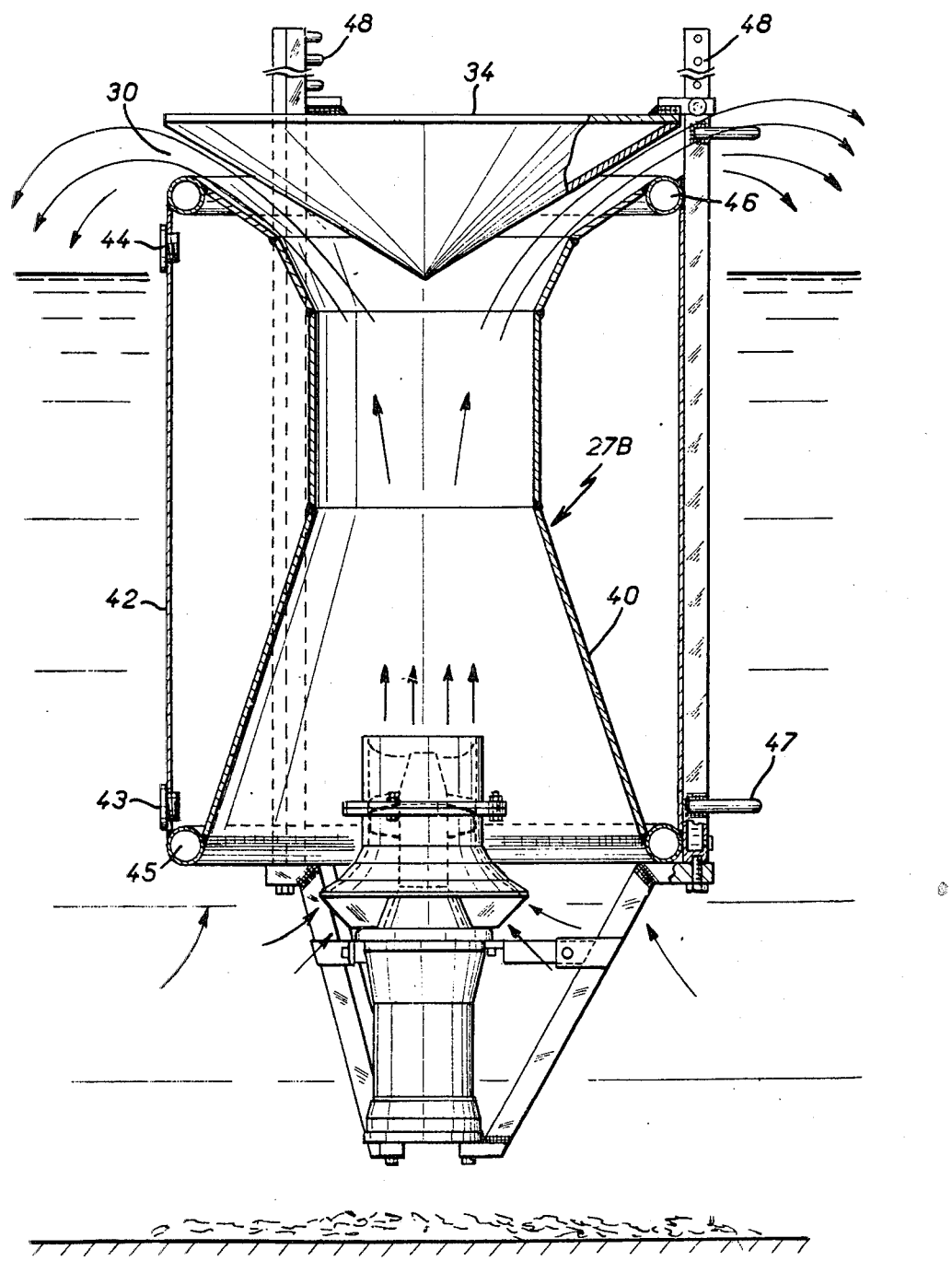
FIG. 4 is a view in axial section of another alternative embodiment with a cylindrical buoy.

In the alternative embodiment of FIG. 4, the transition duct 27B has a frustum-shaped length 40, which acts as a secondary flared suction tube. The coaxial buoy 42 is provided with apertures 43, 44 for introducing or discharging the liquid or solid ballast, as well as with stiffening rings 45, 46, which create a rounding of the level of entry of the secondary flow. A shackle 47 is provided for the manipulation or controlled displacement of the whole device. The extensions 48 are intended for adjusting the diffuser, that is to say the height of the needle 34 in the delivery nozzle 30.

In fact, in any of these embodiments the shape of the dispersion sheet can be modulated, for a given profile of the delivery nozzle, by a suitable vertical adjustment of the needle 34. In the case of the embodiment using needle 34, which is subjected to the action of compressed springs 36 (FIGS. 1, 2 and 3), the vertical position of the needle varies in dependence on the characteristics of the springs and on the hydraulic thrust.

In the embodiment of FIG. 4, the action of the springs is assumed to be replaced by the mass of the needle.

In a more elaborate embodiment, an adjusting device is provided, which is designed to fix the height of the needle by means of any suitable servocontrol.

Apart from the advantages already described, a person skilled in the art will appreciate those which stem from:

(i) the absence of a reducing mechanism for the drive (direct drive of the screw by the motor);

(ii) an ultra-short transmission shaft;

(iii) bearings protected by oil, since they are located in the motor chamber;

(iv) the absence of mechanical noise (that of water falling in a cascade can be muffled greatly by means of a screen.

(v) the extreme ease with which the device is adapted ("on demand") to the depth of the tank by means of an appropriate sizing of the intermediate duct between the flared suction tube and the diffuser (the characteristics of tank are independent of the aerator);

(vi) the possibility of adjustment at the level of the diffuser;

(vii) the possibilities of manipulation and displacement because of the (adjustable) self-buoyancy of the device according to the invention; and (viii) the possibility of injecting additives of any kind.

The invention includes any modification or alternative within the scope of the appended claims.

I claim:

1. A device for dispersing liquid from a bed or tank into a gas phase with which the liquid defines a liquid-gas interface, said device comprising a primary flared suction tube for liquid intake, said tube tapering in the direction of the flow of liquid therethrough, a pump submergible in the liquid in the bed or tank at the level of, and enclosed by, said flared suction tube, motor means directly connected to said pump for driving said pump, a delivery nozzle located near the gas-liquid interface having a flared outer surface constituted by a surface of revolution, and duct means for carrying liquid to be dispersed interconnecting said primary suction tube and said delivery nozzle, said duct means being of a height selected as a function of the depth of liquid in the bed or tank for locating said primary suction tube near the bottom of the bed or tank and thereby adapting said device to tank or beds of different depths.

2. A device according to claim 1, further comprising a secondary flared tube spaced outwardly of and concentrically to said primary flared tube, the flow of liquid through said primary flared tube producing a secondary upward flow which mixes with the flow of liquid through said primary tube downstream of said pump.

3. A device according to claim 1, further comprising an intake for introducing an additional substance into the liquid being pumped.

4. A device according to claim 1, further comprising a cylindrical buoy for making said device floatable, said buoy extending along said duct means over a length adapted to its transverse dimension.

5. A device according to claim 4, said buoy having means for filling an adjustable part of the volume of said buoy.

6. A device according to claim 1, wherein said motor means is arranged beneath said pump, at and at least partly beneath the inlet end of said primary flared tube.

7. A device according to claim 6, wherein at least two radially extending arms support said motor means in, and along the axis of, said primary flared tube.

8. A device according to claim 2, wherein said motor means are arranged beneath said pump, said motor means being located along the axis of said primary flared tube, and at least two radially extending arms supporting said motor means.

9. A device according to claim 2, further comprising a cylindrical buoy for making said device floatable, said buoy extending around and between said delivery nozzle and said secondary flared tube.

10. A device according to claim 2, wherein said delivery nozzle, duct means and secondary flared tube are made of connected sheet material elements.

11. A device according to claim 2, wherein said primary suction tube is disposed at the inlet of said secondary suction tube.

* * * * *